April 19, 1960 — F. A. HOGLAN — 2,933,524
GLUTAMIC ACID RECOVERY
Filed Jan. 28, 1957
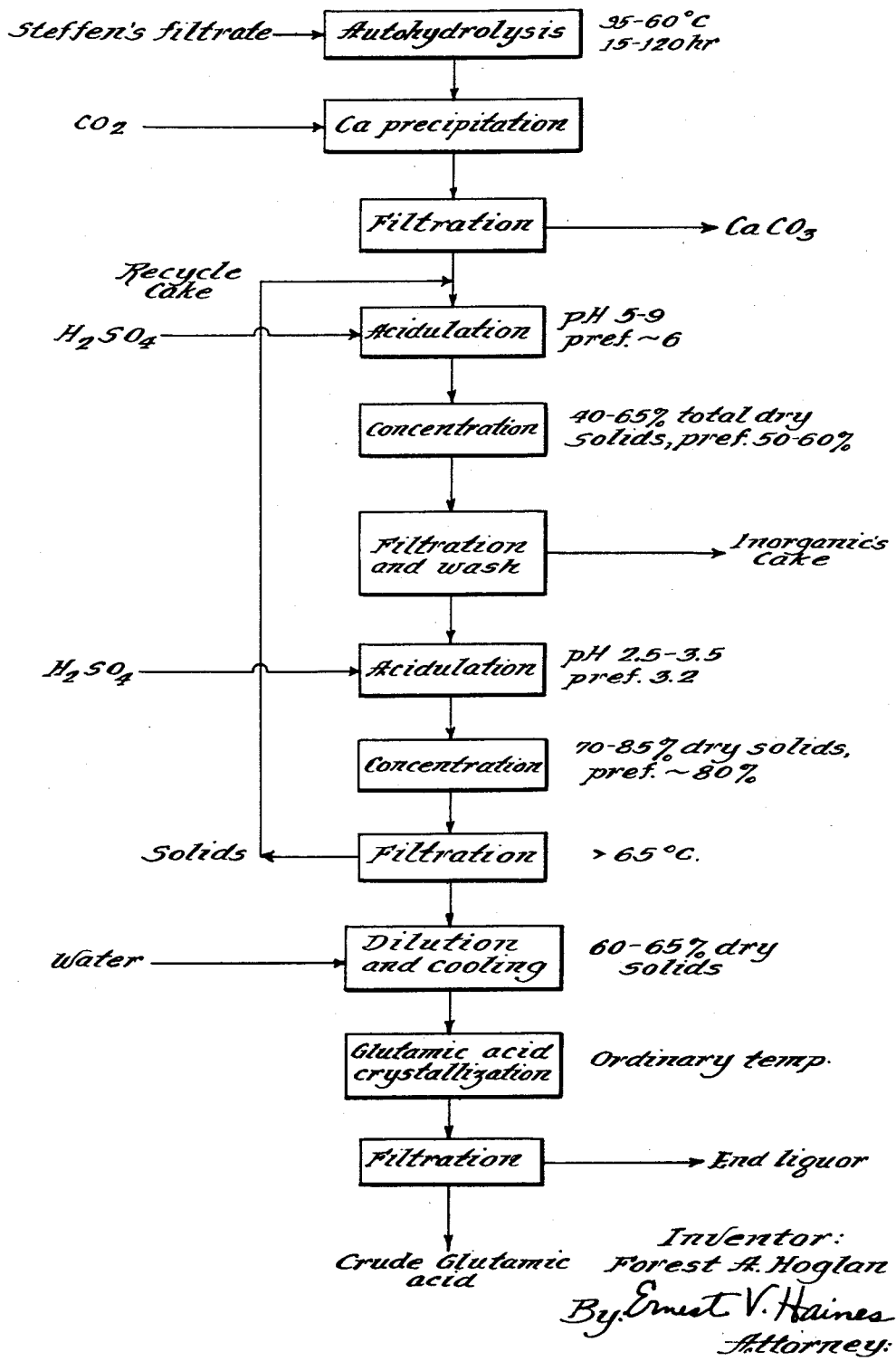
Inventor:
Forest A. Hoglan
By Ernest V. Haines
Attorney

United States Patent Office 2,933,524
Patented Apr. 19, 1960

2,933,524

GLUTAMIC ACID RECOVERY

Forest A. Hoglan, Glenview, Ill., assignor to International Minerals & Chemical Corporation, a corporation of New York Application January 28, 1957, Serial No. 636,691

2 Claims. (Cl. 260—527)

This invention relates to a process for recovery of glutamic acid from glutamic acid mother substances. More particularly, it relates to a process for recovery of glutamic acid from sugar beet waste liquors, such as Steffen's filtrate, containing glutamic acid precursor compounds, and for minimizing the loss of glutamic acid in the inorganic salts obtained as a by-product therefrom.

One process for the commercial production of glutamic acid involves the following steps. A Steffen's filtrate is hydrolyzed under alkaline conditions, and the hydrolyzate is carbonated to separate calcium therefrom in the form of calcium carbonate, then concentrated to about 40% dry solids and acidified to about pH 3.2 with sulfuric acid. Inorganic salts are precipitated thereby, and are filtered off. The filtrate is further concentrated to about 70% dry solids, and a second crop of inorganic salts is filtered off at a temperature maintained above about 65° C. to minimize glutamic acid crystallization. The filtrate is diluted slightly to repress further inorganic salt crystallization, then cooled to ordinary temperatures, and glutamic acid is crystallized therefrom. This process has a number of advantages, but it suffers from the fact that glutamic acid tends to crystallize with the second crop of inorganic salts, from which it is not recovered in the process as heretofore practised, and the losses of glutamic acid become more and more severe as the quality of the starting material exceeds about 200 pounds of monosodium glutamate equivalent per ton of total solids, exclusive of calcium compounds and the like.

The present invention is an improved glutamic acid recovery process employing alkaline hydrolysis of a sugar beet waste liquor and sulfuric acid acidulation of the hydrolyzate, coupled with certain critical operating and recycle features whereby the loss of glutamic acid in the inorganic salt cakes is minimized.

An object of the present invention is to recover glutamic acid from sugar beet waste liquors in improved yield.

Another object is to minimize the losses of glutamic acid in the inorganic salts and end liquors obtained as by-products in the treatment of sugar beet waste liquors.

Another object is to improve the recovery of glutamic acid from medium-grade Steffan's filtrates.

These and other objects of the invention will be apparent from the following specification and claims.

My invention in a broad aspect is an improvement in the process for recovering glutamic acid from sugar beet waste liquors by alkaline hydrolysis, followed by sulfuric acid acidulation. In accordance with my invention, a sugar beet waste liquor containing between about 200 and about 250 pounds of glutamic acid values, calculated as monosodium glutamate, per ton of dry solids, exclusive of calcium, barium or other alkaline-earth metal compounds, is hydrolyzed at elevated temperature with alkali. The hydrolyzate is adjusted to a pH between about 5 and about 9 or somewhat higher and to a dissolved solids content between about 40 and about 65% by weight or somewhat higher by appropriate addition of an acidic inorganic salt fraction, described hereinafter, and optimally certain acidic recycle liquors and/or sulfuric acid, and by concentrating, if and to such extent as required. Inorganic salts are removed by filtration or the like, and the liquid phase further acidified with sulfuric acid to between about pH 2.5 and 3.5 and concentrated to a dissolved solids content of about 65 to about 85%, whereby a second crop of inorganic solids is obtained with a substantial glutamic acid content. The solids are removed at a temperature above about 65° C. to minimize the quantity of glutamic acid therein. These solids are recycled to the hydrolyzate prior to or in conjunction with the first acidulation. The liquid phase is diluted with water if necessary to a dissolved solids content around 60 to 80% by weight to repress the precipitation of further inorganic salts, then cooled to ordinary temperatures, and glutamic acid is crystallized therefrom. The crude glutamic acid is purified by conventional means. The volume of end liquor and the glutamic acid content thereof are materially lower than in the prior-art processes.

My invention is suitable in general for the treatment of sugar beet waste liquors containing glutamic acid precursor compounds equivalent to between about 200 and about 250 pounds of monosodium glutamate ("MSGE") per ton of total solids, exclusive of barium, calcium, and other alkaline earth metal compounds (which are commonly removed in a separate step in advance of the other inorganic constituents). Liquors of lower quality with respect to MSGE content do not ordinarily give rise to any serious problem of glutamic acid losses in the inorganic cake, while liquors of higher quality lead to a continuing increase in quantity of the recycled inorganics cake if treated as in my invention. Among suitable types of liquors are Steffen's filtrate, barium filtrate, and the like, and concentrates thereof, which are obtained as by-products in the sugar beet industry following the removal of sugar from beet molasses, and residual liquors from the fermentation thereof, such as vinasse, schlempe, citric acid fermentation residues, and the like "Steffen's filtrate" refers to waste liquors remaining after the separation of sugar from beet molasses by precipitation as calcium saccharate. Similarly, "barium filtrate" refers to waste liquors remaining after the separation of sugar from beet molasses by precipitation as barium saccharate.

An advantageous embodiment of my invention is illustrated in the attached drawing. The said embodiment employs waste liquor from the Steffen's process as the starting material. This liquor contains around 2% by weight of total solids, and for most effective treatment in my process, it should contain between about 200 and 250 pounds of monosodium glutamate equivalent (i.e., potential glutamic acid, calculated as monosodium glutamate, and referred to hereinafter as "MSGE") per ton of total solids, exclusive of calcium compounds. Included in the solids are a sufficient quantity of sodium hydroxide, potassium hydroxide, and calcium hydroxide to produce a pH between about 9 and about 12.5. The liquor, as it emerges from the Steffen's process, is at a temperature around 95° C., and the glutamic acid precursor compounds therein can be effectively hydrolyzed by storing the liquor for a period of time in an insulated vessel. The hydrolysis reaches a satisfactory level in from about 15 to about 120 hours, during which time the temperature will ordinarily drop to around 60° C.

The hydrolyzate is contacted with a sufficient quantity of carbon dioxide to precipitate the calcium substantially completely therefrom in the form of calcium carbonate. The pH will thereby be reduced to less than about 12. The calcium carbonate precipitate is removed by filtration, centrifugation, or the like and is washed with water to recover any entrained glutamic acid values. The combined filtrate and wash water are commingled with an inorganic salt cake containing glutamic acid, recycled from a later step of the process. This cake (being at pH 3.2) contains a quantity of sulfuric acid values in loose combination with organic substances, and acts in part to acidulate the filtered hydrolyzate. A sufficient additional quantity of sulfuric acid is added to reduce the pH of the mixture to between about 5 and about 9, preferably between about 5.5 and about 6.5. Under these conditions, the glutamic acid contained in the recycled inorganic salt cake is substantially completely redissolved. The mixture is then concentrated, preferably under vacuum, to a dissolved solids content between about 40 and about 65% by weight, preferably between about 50 and about 60%. I prefer to carry out the concentration at this point; alternatively, however, it is possible to carry out the concentration prior to addition of the recycle cake, and/or prior to any further acidulation, although these are less advantageous embodiments of the invention. A heavy slurry results from the concentration step, and is filtered or centrifuged. The solids content can be somewhat higher, up to about 80%, if the separation of solids is carried out at elevated temperatures, e.g., up to 75° C. or higher. The inorganics cake is washed with water and rejected from the process. This cake contains little or no glutamic acid values.

The filtrate is further acidified to around pH 2.5-3.5, preferably about pH 3.2, then concentrated under reduced pressure to about 65 to about 86% dissolved solids, preferably around 80%. A second crop of inorganic salts is produced thereby, and is filtered off or centrifuged while the slurry is maintained at a temperature above about 65° C. in order to minimize crystallization of glutamic acid. These solids nevertheless contain a considerable proportion of glutamic acid, owing to the solubilities involved in this system. I have found that the glutamic acid values therein can be substantially completely recovered by recycling the entire cake to the hydrolyzate, where the acid content thereof is expended to effect part of the first acidulation to pH 5-9. By means of this recycle, the glutamic acid values are redissolved and recovered, and the inorganic salts are then rejected under conditions which avoid entrainment of glutamic acid.

The liquid phase is thereupon diluted slightly with water, if and as required, to a dissolved solids content of about 60 to about 80%, preferably about 60 to about 65%, in order to inhibit further crystallization of inorganic solids, and is then cooled to ordinary temperatures below about 35° C. The liquid may be seeded with glutamic acid crystals if desired, and glutamic acid crystallizes therefrom in a period of about 1 to about 6 days. The glutamic acid slurry is filtered or centrifuged to separate the crude glutamic acid, leaving an end liquor of decreased volume and glutamic acid content, compared with the processes of the prior art.

The crude glutamic acid is purified in a conventional manner. It is ordinarily first repulped with a mother liquor obtained in the crystallization of purified glutamic acid, filtered, slurried in water and adjusted to pH 6-7 with sodium hydroxide, treated with decolorizing carbon, and reacidified to pH 3.2, at which point purified glutamic acid readily crystallizes. Many modifications and alternative procedures are described in the prior art.

In another embodiment of the invention, thin barium filtrate is subjected to autohydrolysis, and the resulting hydrolyzate is treated as set forth hereinabove. Thin barium filtrate is the residual solution remaining after the precipitation of sugar from sugar beet molasses as barium saccharate. Thin barium filtrate contains about 80% water, together with hydroxides of barium, sodium, and potassium, a quantity of sugar and other carbohydrates, organic acids, and nitrogenous substances, including glutamic acid and glutamic acid mother substances, such as pyrrolidonecarboxylic acid. This material, as discharged from the desugarizing process and prior to carbonation and concentration, possesses sufficient alkalinity to produce a pH of about 10 to about 12 or higher. If stored in an insulated vessel at the discharge temperature, around 95° C., it cools slowly, and simultaneously the glutamic acid mother substances undergo autohydrolysis. Nearly complete hydrolysis takes place in from about 3 to about 120 hours at a temperature between about 95 and about 55° C. Further hydrolysis may then be produced if desired by concentrating the hydrolyzate to a dissolved solids content between about 40 and about 85% by weight. Alternatively, the autohydrolysis and the concentration may be carried out simultaneously.

The alkaline hydrolysis of my starting material can be carried out in accordance with any of the techniques described in the art. Thin Steffen's filtrate or thin barium filtrate can conveniently be subjected to autohydrolysis, as described above. Concentrated filtrates containing, for example, from about 40 to about 65% solids can be hydrolyzed with potassium hydroxide or preferably sodium hydroxide, employing up to about 10% by weight thereof, preferably from about 4 to about 8%, and heating at 60 to 100° C. for 1 to 4 hours (e.g., 2¼ hours at 85° C.).

While the hydrolysis of sugar beet waste liquors can readily and effectively be carried out with strong caustic substances such as sodium hydroxide or potassium hydroxide, certain advantages attach to the use of the alkaline-earth metal hydroxides for this purpose. A principal advantage lies in the fact that the alkaline-earth metals are conveniently removed from the hydrolyzate as insoluble salts such as the sulfate, the carbonate, the phosphate, the sulfite, and the like, and thus lessen the problem of removing inorganic salts at later stages of the process. For this purpose, the art teaches that calcium hydroxide can be employed. I have found that barium hydroxide and strontium hydroxide can also be employed, with superior results. In the use of the latter substances, it is advantageous to adjust the solids concentration of the waste liquor to between about 25 and about 55% by weight for most effective hydrolysis. Between about 5 and about 25% by weight of the hydrolytic agent, based on the starting material, should be employed, and the mixture should be heated to a temperature between about 65 and about 100° C. for a period ranging between about 1 and about 8 hours, preferably around 85° C. for about 2½ hours. The hydrolytic agent is then conveniently removed by cooling the hydrolyzate to about 60° C. or lower and treating with carbon dioxide to adjust the pH to a value between about 8.0 and about 12.0, at least as low as the initial pH of the waste liquor. The resulting pH will be between about 9.5 and about 10.5 in the case of Steffen's filtrates obtained from beets grown west of the Rocky Mountains, and up to about 11.5 for Rocky Mountain filtrates. The carbonation reaction results in the formation of a precipitate of barium or strontium carbonate, which may readily be removed by filtration. In place of carbon dioxide, the hydrolyzate may be treated with sulfuric acid, sulfur dioxide, sodium carbonate, sodium bicarbonate, sodium sulfite, sodium phosphate, the corresponding potassium salts, and the like. Best results, however, are obtained with carbon dioxide.

The following example illustrates the application of my invention to the treatment of a concentrated Steffen's filtrate having a pH of 9 and containing 50% solids, including 220 parts of monosodium glutamate equivalent per ton of total solids. All parts and percentages are by weight unless otherwise specified.

*Example*

The concentrated Steffen's filtrate (1000 parts) is hydrolyzed by heating with 120 parts of aqueous 50% sodium hydroxide solution at 85° C. for 2¼ hours. The hydrolyzate is cooled to room temperature, and to it are added 300 parts of crude glutamic acid repulp water from a previous batch, containing 5 parts of MSGE; 150 parts of pH 3.2 inorganics cake from a previous batch, containing 30 parts of MSGE; and 150 parts of aqueous 50% sulfuric acid. The resulting mixture, having a pH of 6.0, is thoroughly agitated, then filtered, and the filter cake is washed with 100 parts of water. The washed cake, containing 130 parts of dry solids, including 0.1 part of MSGE, is rejected from the process.

The filtrate is acidified to pH 3.2 with 230 parts of 50% sulfuric acid, then concentrated to 790 parts (approximately 78% solids content), and filtered rapidly at about 80° C. The filter cake, containing 150 parts of dry solids, including 30 parts of MSGE, is recycled to the hydrolyzate in a succeeding batch.

The filtrate is diluted with 45 parts of water to a solids content of 70%, then cooled to room temperature, and allowed to stand for five days while crude glutamic acid crystallizes therefrom. The crude glutamic acid is filtered off, repulped with mother liquor from the filtration of purified glutamic acid in a subsequent step of a previous batch, and again filtered. The filtrate is recycled to the hydrolyzate in a succeeding batch. The glutamic acid cake is slurried with water, adjusted to pH 6 with sodium hydroxide, decolorized with activated carbon, and reacidified to pH 3.2 with sulfuric acid. Purified glutamic acid is crystallized therefrom, filtered off, and dried. The mother liquor is recycled to repulp the crude glutamic acid from a succeeding batch. The dried purified glutamic acid weighs about 29 parts, corresponding to about 36.5 parts of MSGE.

After appropriate adjustments for recycle, the material balance in the foregoing process is as follows:

| | Percent |
|---|---|
| MSGE recovery | 65 |
| MSGE loss in end liquor | 35 |
| MSGE loss with inorganics | 0 |

The foregoing example is submitted only to illustrate a preferred embodiment of the present invention, and in no way as a limitation upon the scope thereof. Numerous modifications and equivalents of the invention will be apparent to those skilled in the art from the foregoing description.

In accordance with the present description, I claim as my invention:

1. A process for recovery glutamic acid from a sugar beet waste water selected from the group consisting of Steffen's filtrate and barium filtrate, said waste water containing glutamic acid values equivalent to between about 200 and about 250 pounds of monosodium glutamate per ton of total solids, exclusive of alkaline-earth metal compounds, which comprises hydrolyzing the glutamic acid precursors in said waste water at elevated temperature under alkaline conditions, commingling the hydrolyzate with a substance whereby any alkaline-earth compounds therein are converted into compositions insoluble in said hydrolyzate, separating said insoluble compositions therefrom, acidifying the hydrolyzate with sulfuric acid to a pH between about 5 and 9, concentrating the hydrolyzate to a dissolved solids concentration between about 40 and about 65% by weight, separating inorganic salts therefrom, acidifying the liquid phase with sulfuric acid to a pH between about 2.5 and about 3.5, concentrating to a dissolved solids content between about 65 and about 85% by weight, separating therefrom at a temperature above about 65° C. a mixture of inorganic salts containing sulfuric acid values and a substantial proportion of glutamic acid, recycling said mixture to said hydrolyzate for effecting, at least in part, said adjustment to a pH between about 5 and about 9, and for recovering the glutamic acid values contained therein, adjusting the liquid phase to a dissolved solids content between about 60 and about 80% by weight by adding water thereto as required, cooling to a temperature below about 35° C., and crystallizing glutamic acid therefrom.

2. A process for recovering glutamic acid from a thin Steffen's filtrate containing glutamic acid values equivalent to between about 200 and about 250 pounds of monosodium glutamate per ton of total solids, exclusive of calcium compounds, which comprises hydrolyzing the glutamic acid precursors in said filtrate at a temperature between about 60 and about 95° C. in the presence of the alkaline materials existing therein, precipitating calcium from the hydrolyzate with carbon dioxide and separating the resulting calcium carbonate therefrom, acidifying the hydrolyzate with sulfuric acid to a pH between about 5 and 9, concentrating the hydrolyzate to a dissolved solids content between about 40 and about 65% by weight, separating inorganic salts therefrom, acidifying the liquid phase with sulfuric acid to a pH between about 2.5 and about 3.5, concentrating to a dissolved solids content between about 65 and about 85% by weight, separating therefrom at a temperature above about 65° C. a mixture of inorganic salts containing sulfuric acid values and a substantial proportion of glutamic acid, recycling said mixture to said hydrolyzate for effecting, at least in part, said adjustment to a pH between about 5 and about 9, and for recovering the glutamic acid values contained therein, diluting the liquid phase to a dissolved solids content between about 60 and about 65% by weight, cooling to a temperature below about 35° C., and crystallizing glutamic acid therefrom.

References Cited in the file of this patent

UNITED STATES PATENTS

| | | |
|---|---|---|
| 2,517,601 | Shafor | Aug. 8, 1950 |
| 2,535,117 | Bennett | Dec. 26, 1950 |
| 2,688,037 | Hoglan | Aug. 31, 1954 |
| 2,730,545 | Hoglan | Jan. 10, 1956 |